United States Patent
Tanaka

(10) Patent No.: US 7,609,399 B2
(45) Date of Patent: Oct. 27, 2009

(54) SCANNING APPARATUS THAT SCANS ONE JOB AMONG A PLURALITY BASED ON IMAGE DATA ON EITHER SIDE

(75) Inventor: Koichi Tanaka, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 812 days.

(21) Appl. No.: 11/258,161

(22) Filed: Oct. 26, 2005

(65) Prior Publication Data
US 2007/0091388 A1 Apr. 26, 2007

(51) Int. Cl.
*H04N 1/04* (2006.01)
*G03G 15/00* (2006.01)

(52) U.S. Cl. .................. 358/1.12; 358/498; 399/85; 399/374

(58) Field of Classification Search ......... 358/400–498; 399/85, 374, 389
See application file for complete search history.

(56) References Cited

U.S. PATENT DOCUMENTS 7,283,284 B2 * 10/2007 Hayashi ............... 358/474
2005/0105145 A1 * 5/2005 Yoo et al. ............... 358/498

FOREIGN PATENT DOCUMENTS

JP 2004064437 A * 2/2004

* cited by examiner

*Primary Examiner*—Kimberly A Williams
(74) *Attorney, Agent, or Firm*—Global IP Counselors, LLP

(57) ABSTRACT

When a plurality of sets of a document with an image formed on one side thereof is read, the plurality of sets (341, 342, and 343) of the document is stacked and arranged in a document tray (33), in a state with front and back sides of each set mutually reversed. By sequentially reading images of the plurality of sets of the document arranged in the document tray (33) and detecting the front and back sides of the document, switching of each set of the document is detected, in response to detection of switching of the front and back sides of the document.

6 Claims, 7 Drawing Sheets

SCANNING APPARATUS THAT SCANS ONE JOB AMONG A PLURALITY BASED ON IMAGE DATA ON EITHER SIDE

FIELD OF THE INVENTION

The present invention relates to an original document reading device for reading an image of an original document.

BACKGROUND INFORMATION

Among original document reading devices, such as copy machines and the like, are automatic document feeders for feeding, one sheet at a time, a plurality of sheets of a document that are stacked and arranged in a document setting unit, and sequentially reading, by a scanner, images of the document.

However, in cases where a document with a plurality of sets is copied using an original document reading device of a type as described above, when it is desired to vary printing modes (for example, number of printed sheets) for each set, the repetitive task of arranging the document in the document setting unit one set at a time, and configuring the printing mode for each set by an operation of an operations unit, before starting a copying operation, must be performed, which is cumbersome.

Consequently, according to the prior art, if a separator sheet is interposed between each set in the document with the plurality of sets before reading, even in cases where a document with a plurality of sets is stacked and arranged in the document setting unit, switching of sets can be detected, and the printing mode for each set can be varied.

However, in configurations such as the abovementioned prior art, the separator sheets for interposing between each set in the document with the plurality of sets have to be expressly prepared, and, additionally, the task of interposing the prepared separator sheets between each set of the document with the plurality of sets is cumbersome.

The present invention was made in view of this background and has as an object the provision of an original document reading device that can more easily detect switching of sets in a document with a plurality of sets.

SUMMARY OF THE INVENTION

In a first aspect of the invention to realize the abovementioned object, an original document reading device (100) includes: a document setting unit (33) in which a plurality of sheets of a document can be stacked and arranged; a document feeding means (35, 36, 39) for feeding, one sheet at a time, the plurality of sheets of the document arranged in the document setting unit; a both-sides reading means (10, 43) for reading an image of each side of the document fed by the document feeding means; a front-back detecting means (51, T2, T7, E3) for detecting front and back sides of the document, based on at least one of the images of each side of the document read by the both-sides reading means; and a means (51, T12, E7) for detecting switching of a set in a document with a plurality of sets, in response to detection of the switching of the front and back sides of the document, by the front-back detecting means, in a process in which the document with the plurality of sets that has been stacked and arranged in the document setting unit is fed one sheet at a time by the document feeding means and the image of each side is read by the both-sides reading means.

Alphabetic and numeric references inside brackets represent constituent elements corresponding to an embodiment described below. This also applies to what follows.

According to this configuration, when a document with an image on one side is stacked and arranged in a plurality of sets in the document setting unit, the front and back sides of each set are arranged to be mutually reversed, and when images of this document are read, it is possible to detect switching of each set in the document, in response to detection of the switching of the front and back sides of the document, by the front-back detecting means.

Accordingly, the task of expressly preparing the separator sheets and inserting them between each set in the document is no longer necessary, and by the simple task of arranging the document with the front and back sides of each set in the document mutually reversed in the document setting unit, detection of the switching of a set in the document with the plurality of sets is possible.

In a second aspect of the original document reading device (100) described in the first aspect of the invention, the both-sides reading means (10, 43) is provided with a front-side reading unit (43) for reading an image of the front side of a document fed by the document feeding means (35, 36, 39), and a back-side reading unit (10) for reading an image of the back side of the document.

According to this configuration, the images of both sides of the document fed by the document feeding means can be read approximately simultaneously by the front-side reading unit and the back-side reading unit. Accordingly, a structure for reversing the front and back sides of the document is provided, and compared to a structure in which the images of both sides of the document are read by one reader, the time required for reading the document can be shortened.

According to a third aspect of the invention, at least one of the front-side reading unit (43) and the back-side reading unit (10) preferably includes a contact image sensor.

DETAILED DESCRIPTION OF THE PREFERRED EMBODIMENTS

An embodiment of the invention is explained in detail below, referring to the figures.

Figure 1:
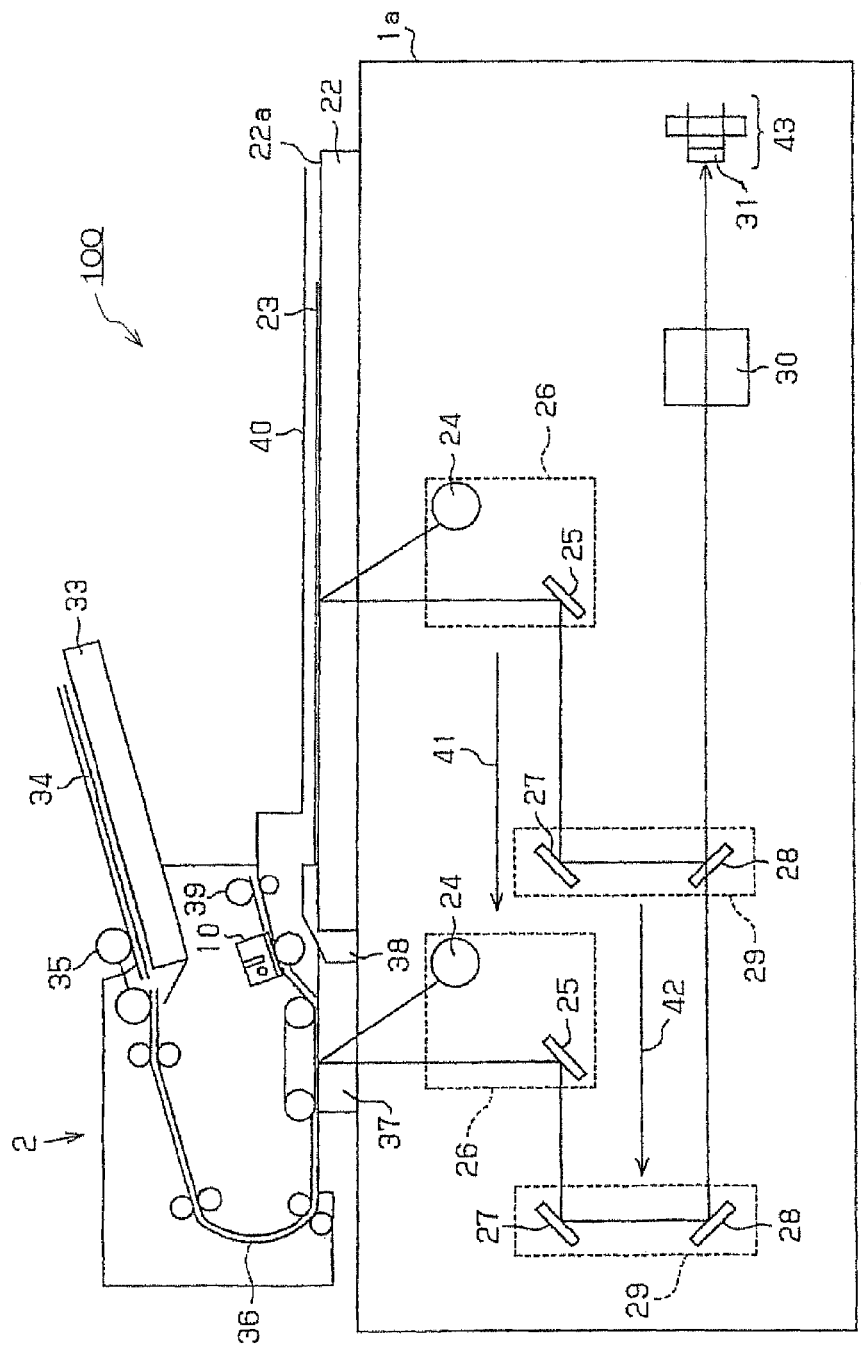
FIG. 1 is a schematic sectional view of an internal configuration of an original document reading device related to an embodiment of the invention.
Figure 2:
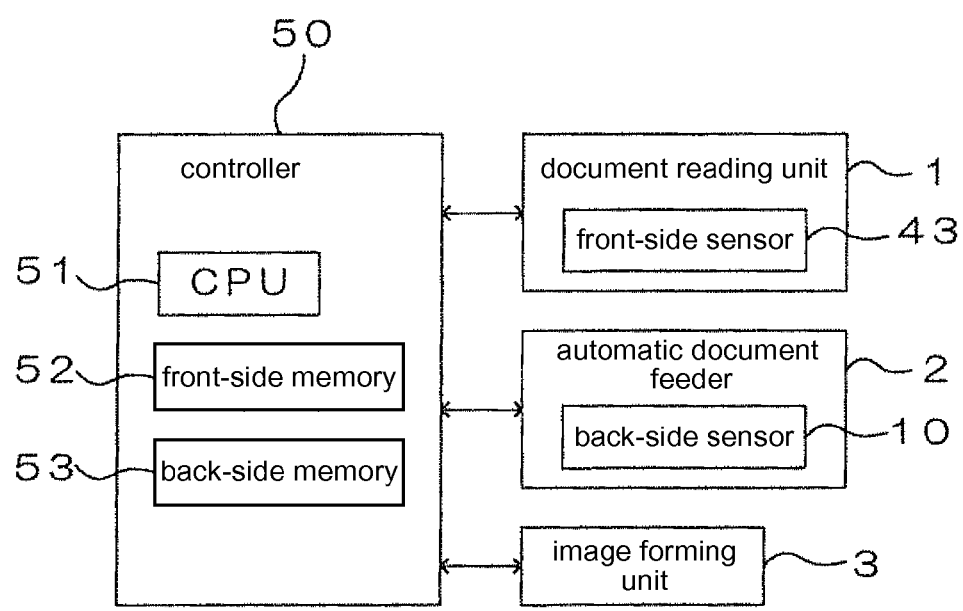
FIG. 2 is a block diagram showing an electrical configuration of an image forming device provided in the original document reading device.

FIG. 1 is a schematic sectional view showing an internal configuration of an original document reading device 100 related to the embodiment of the invention. Furthermore, FIG. 2 is a block diagram showing an electrical configuration of an image forming device provided in the original document reading device 100.

This original document reading device 100 is applicable to image forming devices such as copy machines and the like. The image forming device provided in the original document reading device 100 can, for example, perform image formation processing by transferring a toner image, based on image data of a document read by the original document reading device 100, to paper, by an image forming unit 3. The original document reading device 100 is provided with a document reading unit 1 for reading an image of the document, and an automatic document feeder 2 for automatically feeding, one sheet at a time, a plurality of sheets of the document stacked and arranged in the document tray 33 to the document reading unit 1.

On the upper face of a housing 1a that forms the outer shape of the document reading unit 1, a first contact glass 22 forming most of the upper face of the housing 1a, and a second contact glass 37, disposed at a side of the first contact glass 22, are disposed. The automatic document feeder 2 is rotatable about a rotation axis (not shown in the figure) disposed so as to extend in a left-right direction along the upper edge of the rear area of the document reading unit 1, and can rotate between a closed state (the state shown in FIG. 1), in which the lower face thereof touches the upper face of the first contact glass 22 and the second contact glass 37, and an open state, in which rotation thereof occurs in an upward direction from the closed state, and the upper faces of the first contact glass 22 and the second contact glass 37 are free.

In this original document reading device 100, by opening and closing the automatic document feeder 2 and inserting a document 23, one sheet at a time, between the automatic document feeder 2 and the first contact glass 22, the document 23 can be set on the upper face (platen 22a) of the first contact glass, and an image of the document 23 can be read by the document reading unit 1; and by setting a document 34 in the document tray 33, with the automatic document feeder 2 in a closed state, and feeding the document 34, one sheet at a time, by the automatic document feeder 2, images of a plurality of sheets of the document 34 can be automatically read by the document reading unit 1. In the boundary area between the first contact glass 22 and the second contact glass 37, a guide 38 is disposed for positioning an edge of the document 23 when the document 23 is arranged on the first contact glass 22.

The document reading unit 1 includes, for example, a light source 24 to radiate light towards the document, a front-side sensor 43 for detecting light reflected from the document and transforming it into an electrical signal, first, second, and third reflective mirrors 25, 27, and 28, for reflecting the light reflected from the document and guiding it to a detection face of the front-side sensor 43, and a lens 30 for forming an image of the light reflected by the third reflective mirror 28 and guided to the front-side sensor 43, at the detection face of the front-side sensor 43. The front-side sensor 43 is, for example, a CCD line sensor, with a plurality of CCDs 31 arrayed in a first scan direction (front-rear direction). When the document is read, a first scan of the document is realized by electrical scanning by each CCD 31 of the front-side sensor 43.

The light source 24 and the first reflective mirror 25 form a first optical system 26, and the second reflective mirror 27 and the third reflective mirror 28 form a second optical system. When the document 23 is arranged on the first contact glass 22 and reading of the document 23 is performed, the first optical system 26 moves in a second scanning direction (left-right direction) while the light source 24 illuminates the document 23, and the second optical system 29 moves in the same direction as the first optical system 26 at half the speed. In this way, the optical path length of the light reflected from the document 23 as far as the front-side sensor 43 is held constant. In this way, when the document 23 is arranged on the first contact glass 22 and reading of the document 23 is performed, the second scanning of the document 23 is realized by the light source 24 and the reflective mirrors 25, 27, and 28, moving with respect to the document 23 that is halted.

When reading of the document 34 is performed using the automatic document feeder 2, the first optical system 26 moves in a direction shown by an arrow 41, and the second optical system 29 moves in a direction shown by an arrow 42. After that, in a state in which the first optical system 26 and the second optical system 29 are halted, the document 34, arranged in the document tray 33 so that the front side is facing upwards, is fed one sheet at a time to a document feeding path 36 by a pickup roller 35, and is guided onto the second contact glass 37. In the process of being fed along the document feeding path 36, the front and back sides of the document 34 are reversed, so that the front side thereof is facing the second contact glass 37, as it passes over the second contact glass 37. At this time, the light source 24 is positioned under the second contact glass 37, and the front side of the document 34 that is passing over the second contact glass 37 is continuously illuminated by the light source 24.

On the document feeding path 36 downstream of the second contact glass 37, a back-side sensor 10, composed, for example, of a contact image sensor, is disposed, and by this back-side sensor 10, an image of the back side of the document 34 passing thereunder is read. After the image of the back side has been read by the back-side sensor 10, the document 34 is ejected by an ejection roller 39 to a document ejection unit 40. In this way, when reading of the document 34 is performed using the automatic document feeder 2, by making the document 34 move with respect to the halted light source 24 and reflective mirrors 25, 27, and 28, the second scan of the document 34 is realized.

This operation of the image forming device is controlled by a controller 50 having a CPU 51, a front-side memory 52, and a back-side memory 53 (see FIG. 2). The document reading unit 1, the automatic document feeder 2, and the image forming unit 3 are connected to the controller 50. Image data of the front side of the document read by the front-side sensor 43, and image data of the back side of the document read by the back-side sensor 10, each constitute multi-valued (for example, 0 to 255) image data. The image data of the front side of the document read by the front-side sensor 43 is stored by a front-side memory 52, and the image data of the back side of the document read by the back-side sensor 10 is stored by a back-side memory 53.

Figure 3:
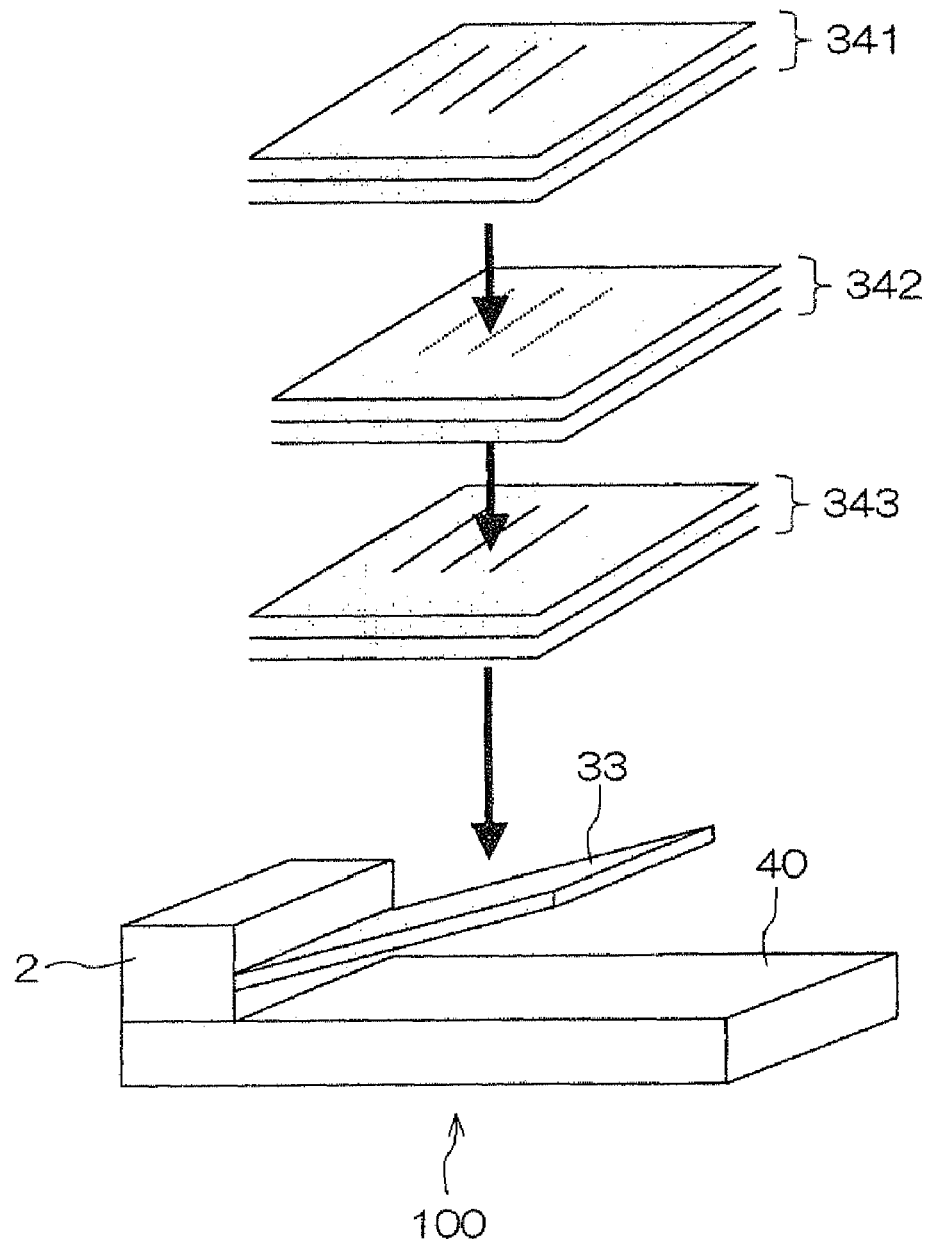
FIG. 3 is a schematic diagram showing an embodiment when images of a document with a plurality of sets are read by the original document reading device.

FIG. 3 is a schematic diagram showing an embodiment when images of a document with a plurality of sets are read by the original document reading device 100.

In this original document reading device 100, when the document with the plurality of sets with an image formed on one side is read, the document with the plurality of sets is stacked and arranged in the document tray 33, in a state with the front and back of each set mutually reversed. In the example of FIG. 3, a first set 341 of the document is arranged so that its front side is facing upwards (front-side placed), a second set 342 of the document is arranged so that its back side is facing upwards (back-side placed), and a third set 343 of the document is arranged so that its front side is facing upwards (front-side placed). However, the first set 341 of the document may be back-side placed, the second set 342 of the document may be front-side placed, and the third set 343 of the document may be back-side placed.

In this embodiment, by sequentially reading images of the document with the plurality of sets, arranged in the document tray 33 with front and back sides of each set mutually reversed, as described above, and by detecting the front and back sides of this document, it is possible to detect switching of each document set, in response to detection of the switching of document front and back sides.

Accordingly, the task of expressly preparing separator sheets and inserting them between each set of the document is no longer necessary, and by the simple task of arranging the document in the document tray 33 with the front and back sides of each set of the document mutually reversed, detection of the switching of the sets of the document with the plurality of sets is possible.

Figure 4:
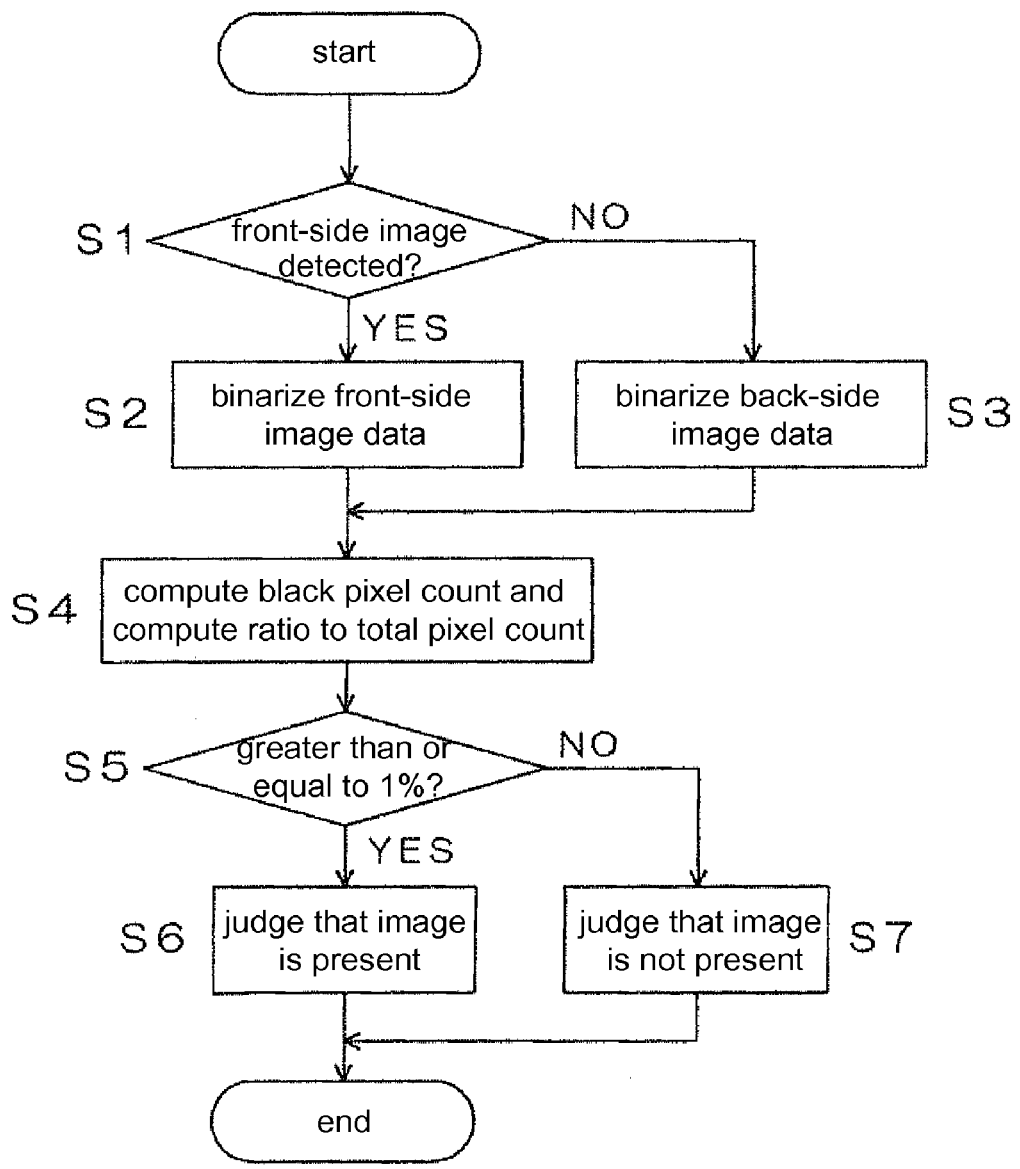
FIG. 4 is a flowchart showing flow of control by a CPU when detecting front and back sides of the document.

FIG. 4 is a flowchart showing flow of control by the CPU 51 when detecting the front and back sides of the document.

Referring to FIG. 4, when detecting the front and back sides of the document, the CPU 51 performs either front-side image detection that detects whether or not there is an image on the front side of the document, or back-side image detection that detects whether or not there is an image on the back side of the document. When front-side image detection is performed (YES in step S1), the CPU 51 binarizes the image data of the front side of the document stored in the front-side memory 52 (step S2). Meanwhile, when back-side image detection is performed (NO in step S1), the CPU 51 binarizes the image data of the back side of the document stored in the back-side memory 53 (step S3).

After that, the CPU 51 computes the number of black pixels included in the binarized image data, and computes the ratio of the number of black pixels to the total number of pixels in the image data (step S4). If the ratio of the number of black pixels to the total number of pixels is equal to or greater than a predetermined value (for example, 1%) (YES in step S5), the CPU 51 judges that there is an image on this side (the front side, in cases of the front-side image detection; the back side, in cases of the back-side image detection) (step S6), and if the ratio of the number of black pixels to the total number of pixels is less than a predetermined value (for example, 1%) (NO in step S5), the CPU 51 judges that there is no image on this side (step S7).

Figure 5A:
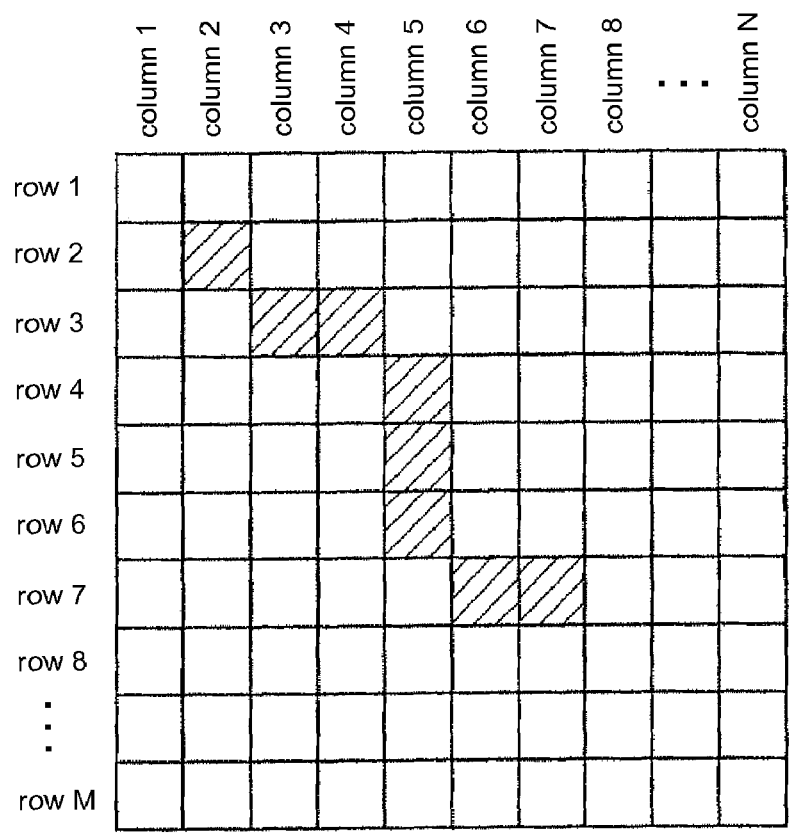
FIG. 5A and FIG. 5B are explanatory diagrams of a transformation example of a method for detecting the front and back sides of the document.
Figure 5B:
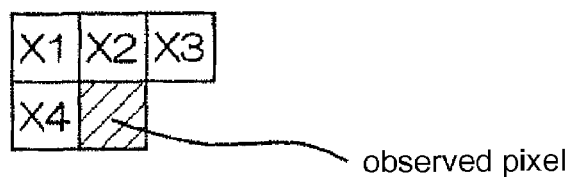

FIGS. 5A and 5B are explanatory diagrams of a transformation method example for detecting the front and back sides of the document.

In the method related to this transformation example, when the front-side image detection is performed, the image data of the front side of the document stored in the front-side memory 52 is binarized, and by computing the connectivity number of the black pixels included in this image data (shown by hatching in FIG. 5), the front and back sides of the document are detected. Meanwhile, when the back-side image detection is performed, the image data of the back side of the document stored in the back-side memory 53 is binarized and by computing the connectivity number of the black pixels included in this image data, the front and back sides of the document are detected.

More specifically, as shown in FIG. 5A, when the connectivity number is computed for the black pixels of the image data consisting of M rows by N columns of pixels, after sequentially observing each pixel in row 1, from column 1to column N, each pixel in row 2is sequentially observed from column 1to column N, and so on, sequentially observing each pixel from row 1to row M. Where an observed pixel is a white pixel, a connectivity number of "0" corresponding to that pixel is stored, and where the observed pixel is a black pixel, a connectivity number of "1" corresponding to that pixel is stored. At this time, where the observed pixel is a black pixel, the connectivity number of this pixel is updated to a number obtained by adding "1" to the largest value among the connectivity numbers of four neighboring pixels, X1, X2, X3, and X4, positioned as shown in FIG. 5B with respect to the observed pixel.

If the connectivity number is computed by this type of method, the connectivity number of the black pixels in the image data as shown in FIG. 5A is "8". If the connectivity number of the black pixels included in the image data is greater than or equal to a predetermined value (for example, "8"), a judgment is made that there is an image on this side (the front side, in cases of front-side image detection; the back side, in cases of the back-side image detection), and if the connectivity number of the black pixels included in the image data is less than a predetermined value (for example, "8"), a judgment is made that there is no image on this side, so that it is possible to detect the front and back sides of the document.

Figure 6:
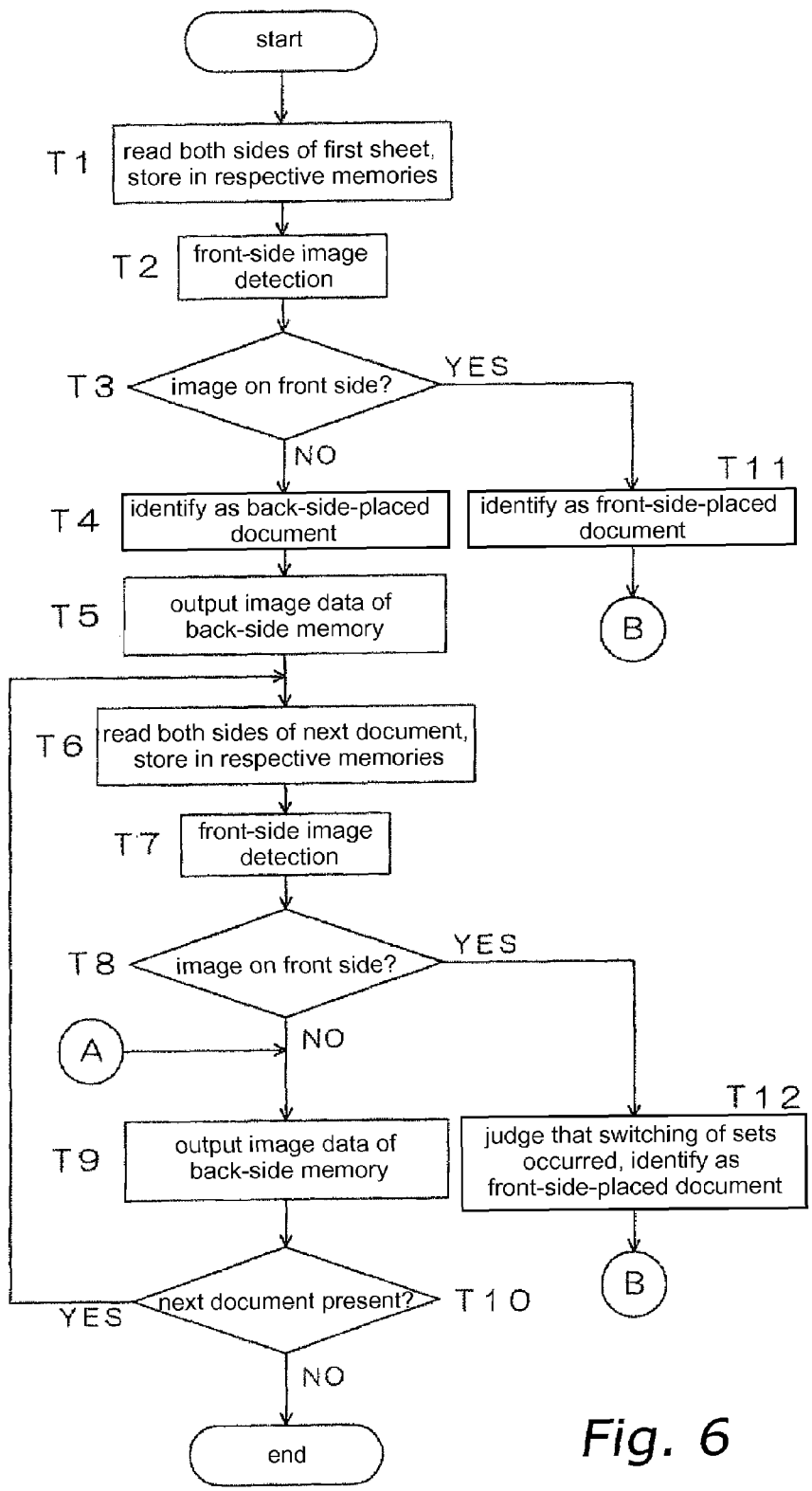
FIG. 6 is a flowchart showing flow of control by the CPU when images of the document with the plurality of sets are read by the original document reading device.
Figure 7:
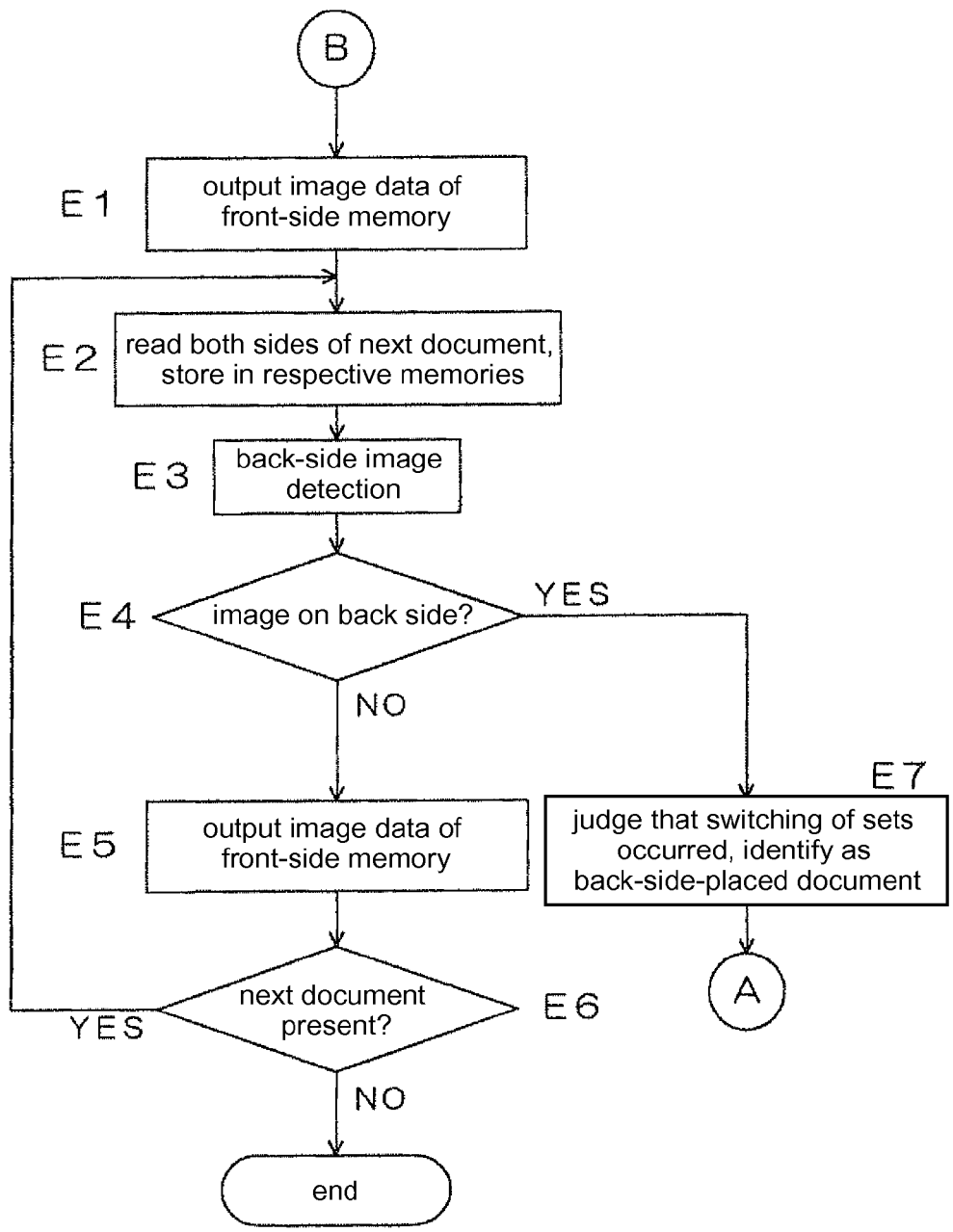
FIG. 7 is a flowchart showing flow of control by the CPU when the images of the document with the plurality of sets are read by the original document reading device.

FIGS. 6 and 7 are flowcharts showing flow of control by the CPU 51 when images of the document with the plurality of sets are read by the original document reading device 100.

Referring to FIGS. 6 and 7, when reading of the document is begun, the CPU 51 firstly feeds the first sheet of the first set of the document (the topmost document sheet) to the document feeding path 36, an image of the front side thereof is read by the front-side sensor 43, and an image of the back side thereof is read by the back-side sensor 10, and this multi-valued image data is stored respectively in the front-side memory 52 and the back-side memory 53 (step T1 in FIG. 6). In this embodiment, the images of both sides of the document fed to the document feeding path 36 can be read almost simultaneously by the front-side sensor 43 and the back-side sensor 10. Accordingly, a structure for reversing the front and back sides of the document is provided, and compared to a structure in which images of both sides of the document are read by one sensor (reading unit), the time required for reading the document can be shortened.

After that, the CPU 51 performs front-side image detection based on the image data stored in the front-side memory 52 (step T2), and if there is no image on the front side (NO in step T3), this document is recognized as a back-side placed document (step T4), and the image data of the back side of the document stored in the back-side memory 53 is outputted to the image forming unit 3 (step T5).

When the CPU 51 outputs the image data of the first sheet of the document (step T5), it feeds the next document sheet to the document feeding path 36; the image of the front side thereof is read by the front-side sensor 43, the image of the back-side is read by the back-side sensor 10, and this multi-valued image data is stored, respectively, in the front-side memory 52 and the back-side memory 53 (step T6).

After that, the CPU 51 performs front-side image detection based on the image data stored in the front-side memory 52 (step T7), and if there is no image on the front side (NO in step T8), since this document continues to be a back-side placed document, with no switching of the sets of the document, the image data of the back side of the document stored in the back-side memory 53 is outputted to the image forming unit 3 (step T9). If a next document is in the document tray 33 (YES in step T10), the CPU 51 performs control from step T6 onwards on the next document. If there is no document in the document tray 33 (NO in step T10), at this point, document reading by the original document reading device 100 is terminated.

In cases where, it is detected that there is an image on the front side (YES in step T3), by the front-side image detection (step T2) of the first sheet of the document, CPU 51 recognizes that this document is front-side placed (step T11). Furthermore, in the process of reading the second and succeeding document sheets as back-side-placed documents, in cases where it is detected by the front-side image detection (step T7) that there is an image on the front side (YES in step T8), the CPU 51 judges that there has been a switching of the sets of the document, and recognizes the document as a front-side-placed document (step T12).

In cases where the document is recognized to be a front-side-placed document (step T11 or step T12), the CPU, after outputting the image data stored in the front-side memory 52 to the image forming unit 3 (step E1 in FIG. 7), feeds the next document sheet to the document feeding path 36; the image of the front side thereof is read by the front-side sensor 43, the image of the back side is read by the back-side sensor 10, and the multi-valued image data thereof is stored, respectively, in the front-side memory 52 and the back-side memory 53 (step E2).

After that, the CPU 51 performs back-side image detection based on the image data stored in the back-side memory 53 (step E3), and if there is no image on the back side (NO in step E4), since this document continues to be a front-side-placed document, with no switching of the sets of the document, the image data of the front side of the document stored in the front-side memory 52 is outputted to the image forming unit 3 (step E5). If a next document is in the document tray 33 (YES in step E6), the CPU 51 performs control from step E2 onwards on the next document. If there is no document in the document tray 33 (NO in step T10), at this point, document reading by the original document reading device 100 is terminated. In the process of reading the document as a front-side-placed document, in cases where it is detected, by back-side image detection (step E3), that there is an image on the back-side (YES in step E4), the CPU 51 judges that there has been a switching of the sets of the document, and recognizes this document as a back-side-placed document (step E7). The CPU 51 performs control from step T9 in FIG. 6 onward.

This invention is not limited to the contents of the above-mentioned embodiment, and various modifications are possible within the scope of the claims described.

For example, there is no limitation to a configuration in which the front side of the document 34 is read by the CCD line sensor (front-side sensor 43) and the back side is read by the contact image sensor (back-side sensor 10); a configuration is also possible in which the front side of the document 34 is read by the contact image sensor and the back side is read by the CCD line sensor; and a configuration is also possible in which the front side and the back side of the document 34 are respectively read by separate contact image sensors.

When detecting the front and back sides of the document, there is no limitation to a configuration in which a detection is made as to whether or not there is an image on a side of a sheet, based on the ratio of the number of black pixels to the total number of pixels in the image data, or the like, and, for example, a configuration is possible in which a detection is made as to whether or not there is an image on a side of the sheet based on the ratio of the number of white pixels to the total number of pixels in the image data, or the like, or a configuration combining these detection methods is also possible.

There is no limitation to a configuration in which the front and back sides of the document are detected based, respectively, on an image of the back side when reading a front-side-placed document, or on an image of the front side when reading a back-side-placed document; a configuration is also possible in which the front and back sides of the document are detected based, respectively, on an image of the front side when reading a front-side-placed document, and on an image of the back side when reading a back-side-placed document; and a configuration is also possible in which the front and back sides of the document are detected based on images of both sides of the document, irrespective of whether the document is front-side-placed or back-side-placed.

What is claimed is:

1. An original document reading device comprising:
    document setting unit means for receiving a plurality of sheets of a document;
    document feeding means for feeding the plurality of sheets of the document arranged in the document setting unit means one sheet at a time;
    both-sides reading means for reading an image of each side of the document fed by the document feeding means;
    front-back detecting means for detecting front and back sides of the document based on at least one of the images of each side of the document read by the both-sides reading means; and
    a means for detecting switching of a set in a document with a plurality of sets in response to detection of switching of the front and back sides of the document with the plurality of sets by the front-back detecting means in a process in which the document with the plurality of sets that has been stacked and arranged in the document setting unit means is fed one sheet at a time by the document feeding means and the image of each side is read by the both-sides reading means.

2. The original document reading device according to claim 1, wherein the both-sides reading means is provided with a front-side reading unit for reading an image of the front side of the document fed by the document feeding means, and a back-side reading unit for reading an image of the back side of the document.

3. The original document reading device according to claim 2, wherein at least one of the front-side reading unit and the back-side reading unit comprises a contact image sensor.

4. The original document reading device according to claim 2, wherein at least one of the front-side reading unit and the back-side reading unit comprises a contact image sensor.

5. The original document reading device according to claim 1, wherein the both-sides reader is provided with a front-side reading unit to read an image of the front side of the document fed by the document feeder, and a back-side reading unit to read an image of the back side of the document.

6. An original document reading device comprising:
    a document setting unit being configured to receive a plurality of sheets of a document having a plurality of sets, each set having images on one of a front or back side, each set being arranged to have images be mutually reversed on the front or back side;
    a document feeder being configured to feed the plurality of sheets of the document arranged in the document setting unit one sheet at a time;
    a both-sides reader being configured to read the images of each side of the document fed by the document feeder;
    a front-back detector being configured to detect the front and back sides of the document based on at least one of the images of each side of the document read by the both-sides reader; and
    a switching detector being configured to detect switching of a set in the document in response to detection of placement of an image being switched from one of the front or back side to the other of the front or back side of the document by the front-back detector in a process in which the document with the plurality of sets that has been stacked and arranged in the document setting unit is fed one sheet at a time by the document feeder and the image of each side is read by the both-sides reader.

* * * * *